UNITED STATES PATENT OFFICE.

JOSEPH SCHNEIBLE, OF CHICAGO, ILLINOIS.

DEALCOHOLIZED FERMENTED BEVERAGE.

1,343,587.  Specification of Letters Patent.  Patented June 15, 1920.

No Drawing.  Application filed July 7, 1919. Serial No. 309,051.

*To all whom it may concern:*

Be it known that I, JOSEPH SCHNEIBLE, a citizen of the United States, residing at 130 North Wells street, Chicago, in the county of Cook and State of Illinois, have invented a new and useful Improvement in Dealcoholized Fermented Beverages, of which the following is a specification.

The subject of the present invention is a new article of manufacture which I produce by the process set forth in my Letters Patent No. 1,311,421, dated June 29, 1919, for the manufacture of ethyl alcohol and residue for beverage.

According to the aforesaid process, the material on which it may be practised are a fermented mash, wort or must, the fermentation of which has been performed in any known or suitable manner to insure normally complete attenuation of the fermentable sugars, and the preparation, as also the clarification or secondary fermentation of which, for the development of taste and flavor, should be conducted in a manner suitable to the particular materials used and according to the type of beverage desired. The fermented material contains, besides ethyl alcohol, vaporizable bodies, some of which have boiling-points higher while some have boiling-points lower than the boiling-point of ethyl alcohol.

These higher boiling-point products of fermentation are the carriers of aroma, taste and flavor in the resulting residue for beverage, or the beverage manufactured therewith, while the lower boiling-point products are not desirable either in the alcohol or the beverage, because of their ready susceptibility to oxidation.

I have discovered, the discovery being original with me, that these higher boiling-point products, instead of being objectionable because supposedly deleterious to the beverage and from which they should therefore be eliminated, are beneficial as constituents thereof because of the aroma, taste and flavor they impart to it and, besides, because they enhance its wholesomeness.

The dealcoholized fermented beverage of my present invention is characterized by containing the aforesaid higher boiling-products, and may be further characterized by absence therefrom of the lower boiling-point products, or their neutralization, and the beverage may be wholly devoid of ethyl alcohol or dealcoholized to any desired comparatively low alcoholic content.

To produce my new article of manufacture by the aforesaid process (without, however, intending to be understood as limiting it to being produced thereby) the fermented mash, wort or must, or, in fact, any alcoholic liquid desired, usually in a cold condition, is drawn from a supply thereof at low absolute pressure of about 3 pounds to the square inch, into a heater and attains therein a temperature of about 140° F. at the point of discharge. The resultant blubbery foamy mass is fractionated by subjection to a lower tension of about 2 pounds absolute pressure per square inch, and bursts violently into a mist by reason of such lower pressure being materially below the boiling pressure of the heated material, thereby sundering the gases and part of the volatile components of the fermented material, which, together with the remaining liquid, flow and are drawn into a column-still by the tension maintained therein, which is slightly below that in the fractionator. As the material descends through the still, it becomes dealcoholized, while the freed gases and vapors, in meeting the rising alcohol-vapors, ascend with the latter into a dephlegmating column for separation and dephlegmation. In rising within the dephlegmating column, the gases and mixed vapors meet the descending phlegm, which acts upon them until substantially all the taste, flavor and aroma bodies are washed from the vapors, and descend with the phlegm into the base of the still, whence they are withdrawn and cooled with the residue, which is further treated for manufacture into the beverage, the treatment involving charging the same with liquid $CO_2$, which should be immediate to avoid absorption by the beverage of contaminating atmospheric air, though the charging need not be to effervescence, but should be at least to the degree that still wines usually attain in their natural state.

It is often desirable and to the advantage of the beverage to dilute it with water.

The lower boiling-point products of distillation being, as aforesaid, undesirable in the beverage-stock, they may either be exhausted with other uncondensable matter to the atmosphere, or they may, while in vapor-form, act as a reducing agent on, say, oxygen in the presence of a suitable catalyzer, and be made available by their dephlegmation, with the desirable products of higher boiling-point, for the residue liquor as an acidifier for adding to the piquancy of the taste of the beverage.

The ethyl-alcohol product of the aforesaid distilling procedure is withdrawn, condensed and collected in accordance with the procedure set forth in the description of my aforesaid process.

I claim:

1. As a new article of manufacture, a beverage comprising the dealcoholized residue of alcoholic liquid containing the products of dephlegmation thereof including the higher boiling-point products of fermentation.

2. As a new article of manufacture, a beverage comprising the dealcoholized residue of alcoholic liquid containing the products of dephlegmation thereof including the higher boiling-point products of fermentation and substantially free from the lower boiling-point products of fermentation.

3. As a new article of manufacture, a beverage comprising the dealcoholized residue of alcoholic liquid containing the products of dephlegmation thereof including the higher boiling-point products of fermentation and the products of oxidation of the lower boiling-point products of fermentation.

4. As a new article of manufacture, a beverage comprising the dealcoholized and carbonated residue of alcoholic liquid containing the products of dephlegmation thereof including the higher boiling-point products of fermentation.

5. As a new article of manufacture, a beverage comprising the dealcoholized and carbonated residue of alcoholic liquid containing the products of dephlegmation thereof including the higher boiling-point products of fermentation and substantially free from the lower boiling-point products of fermentation.

6. As a new article of manufacture, a beverage comprising the dealcoholized and carbonated residue of alcoholic liquid containing the products of dephlegmation thereof including the higher boiling-point products of fermentation and the products of oxidation of the lower boiling-point products of fermentation.

JOSEPH SCHNEIBLE.